April 7, 1953
G. C. ELLERBECK
2,634,053
TABULATION CONTROL INCIDENT TO INDEXING
A MULTIPLICATION FACTOR
Filed Oct. 5, 1948
8 Sheets-Sheet 1
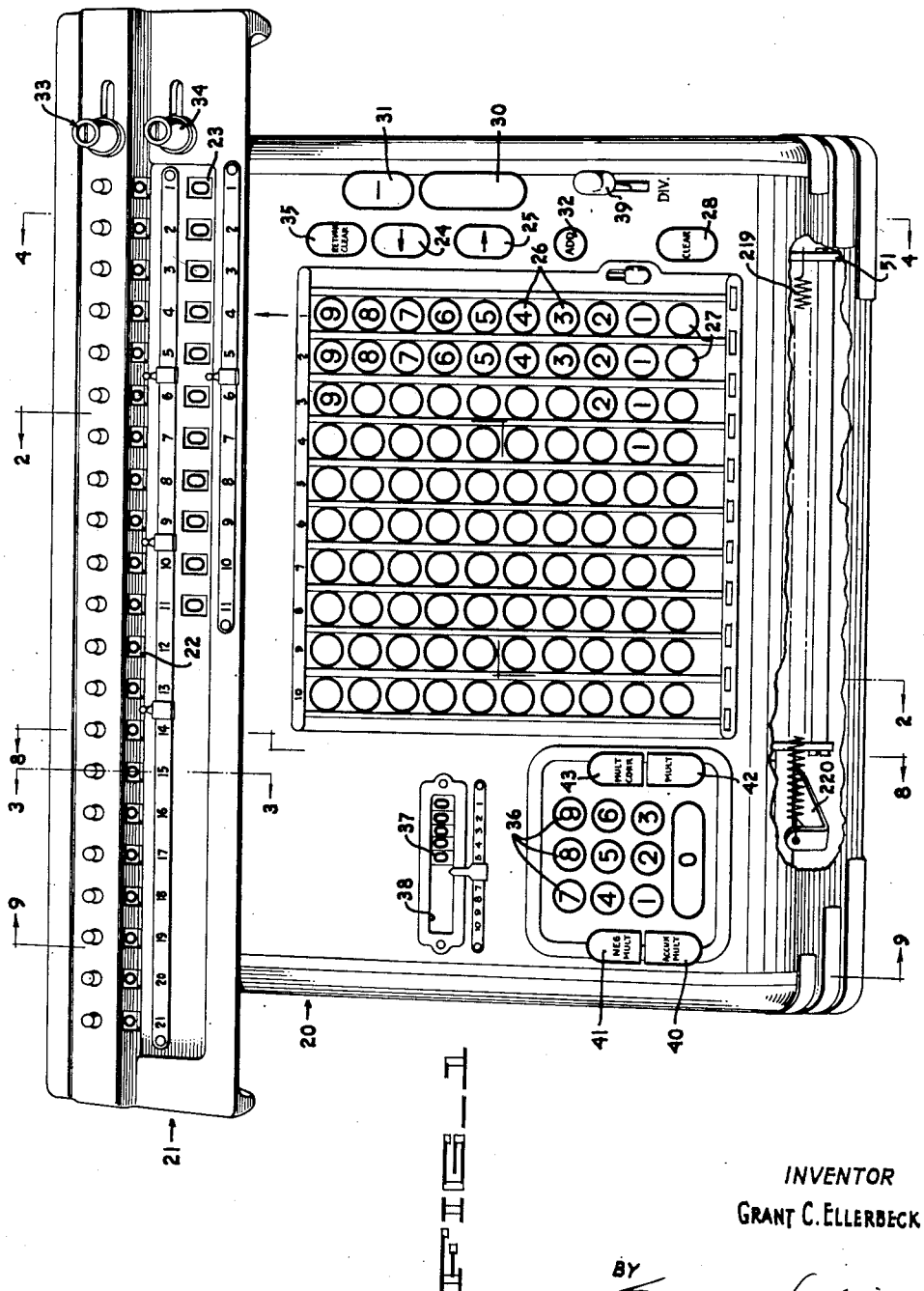
INVENTOR
GRANT C. ELLERBECK
BY

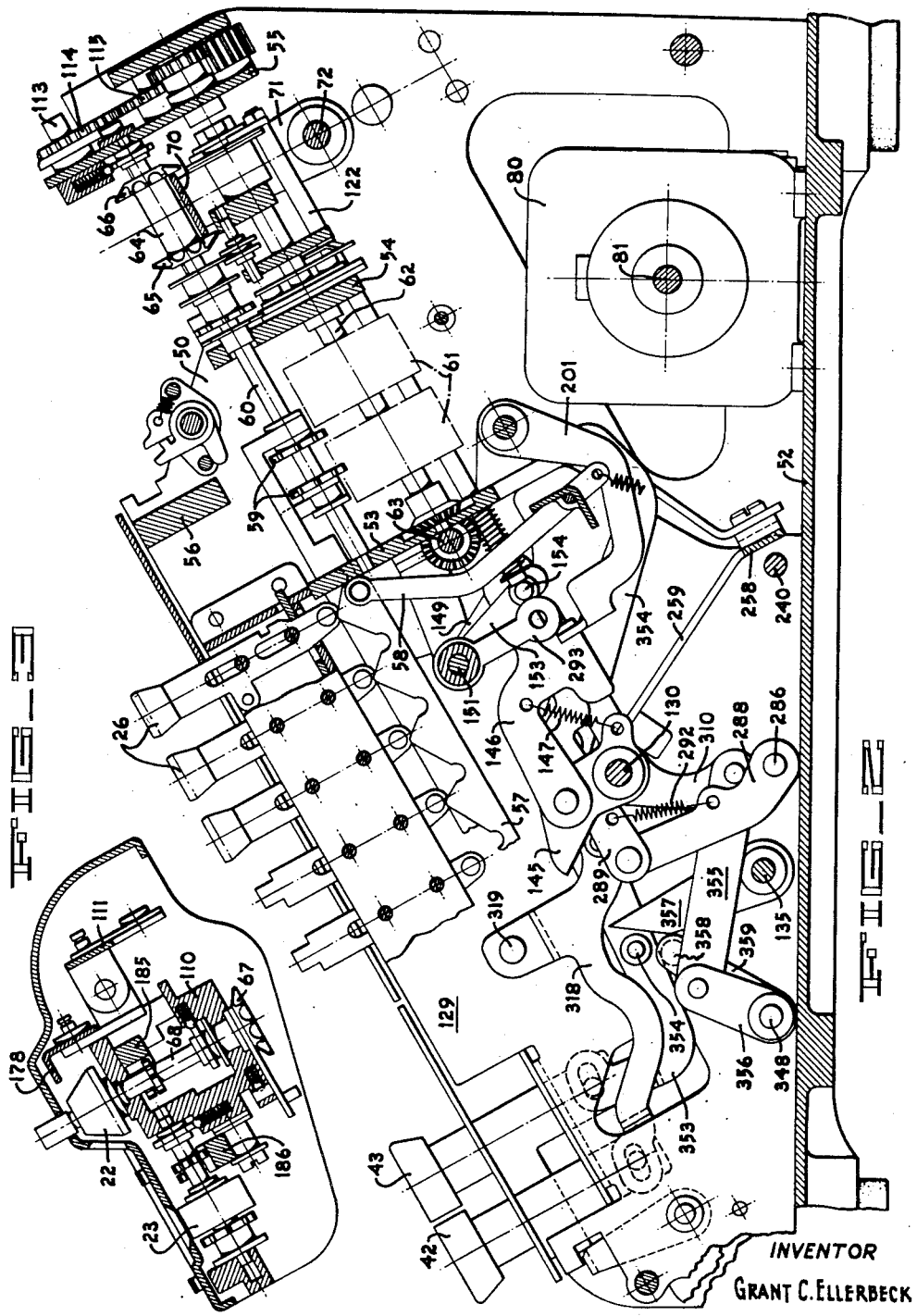
INVENTOR
GRANT C. ELLERBECK

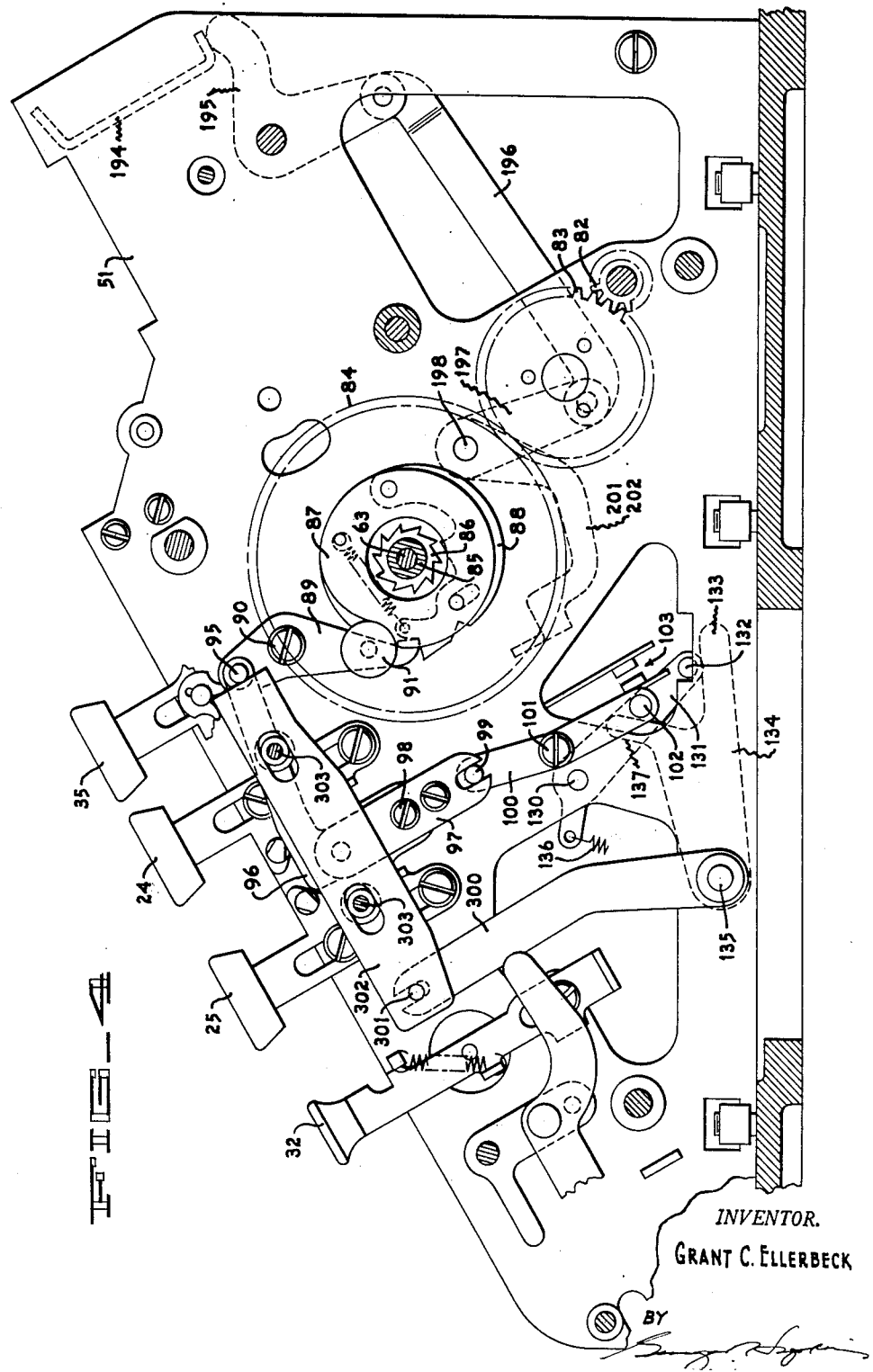

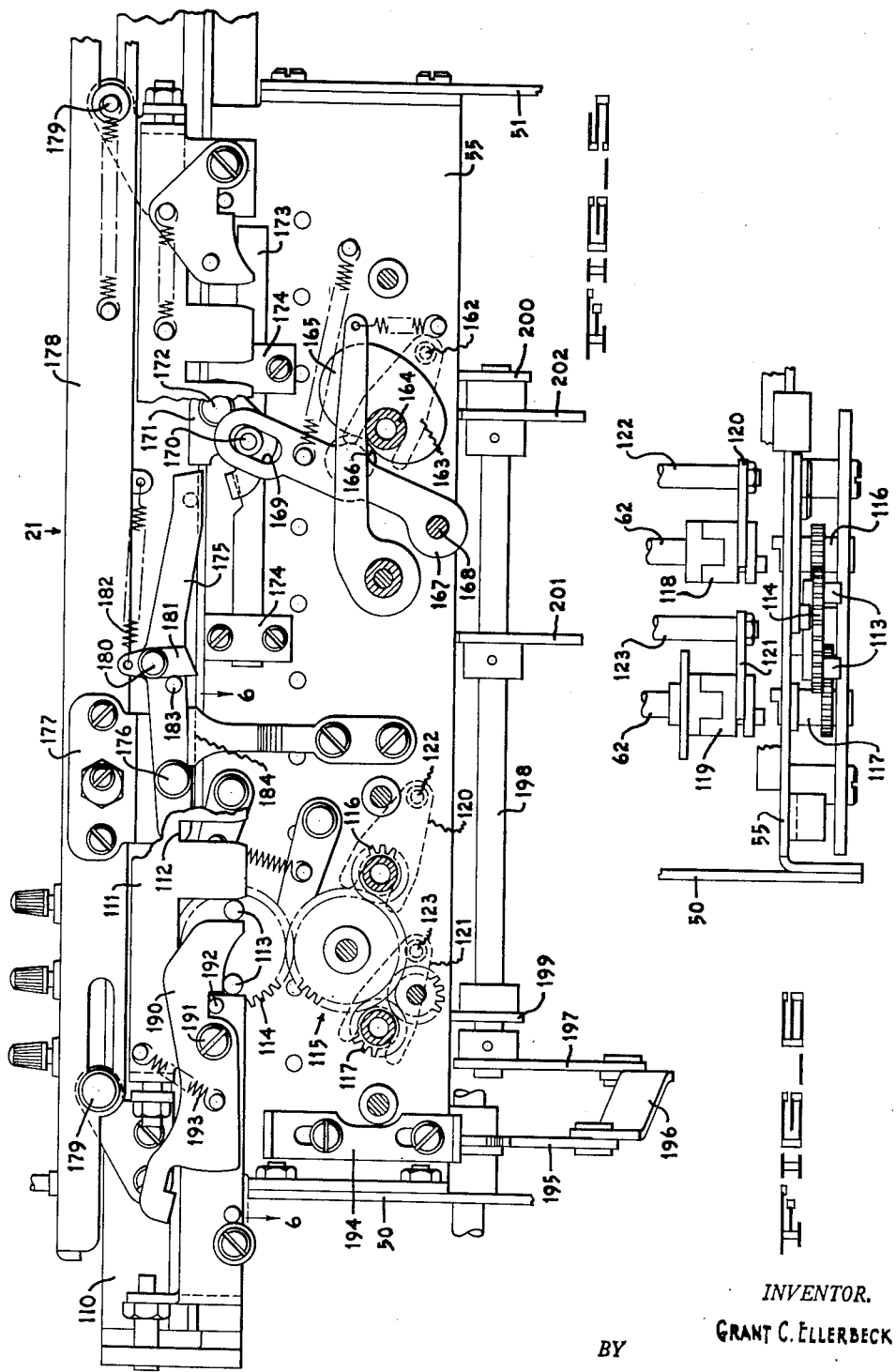

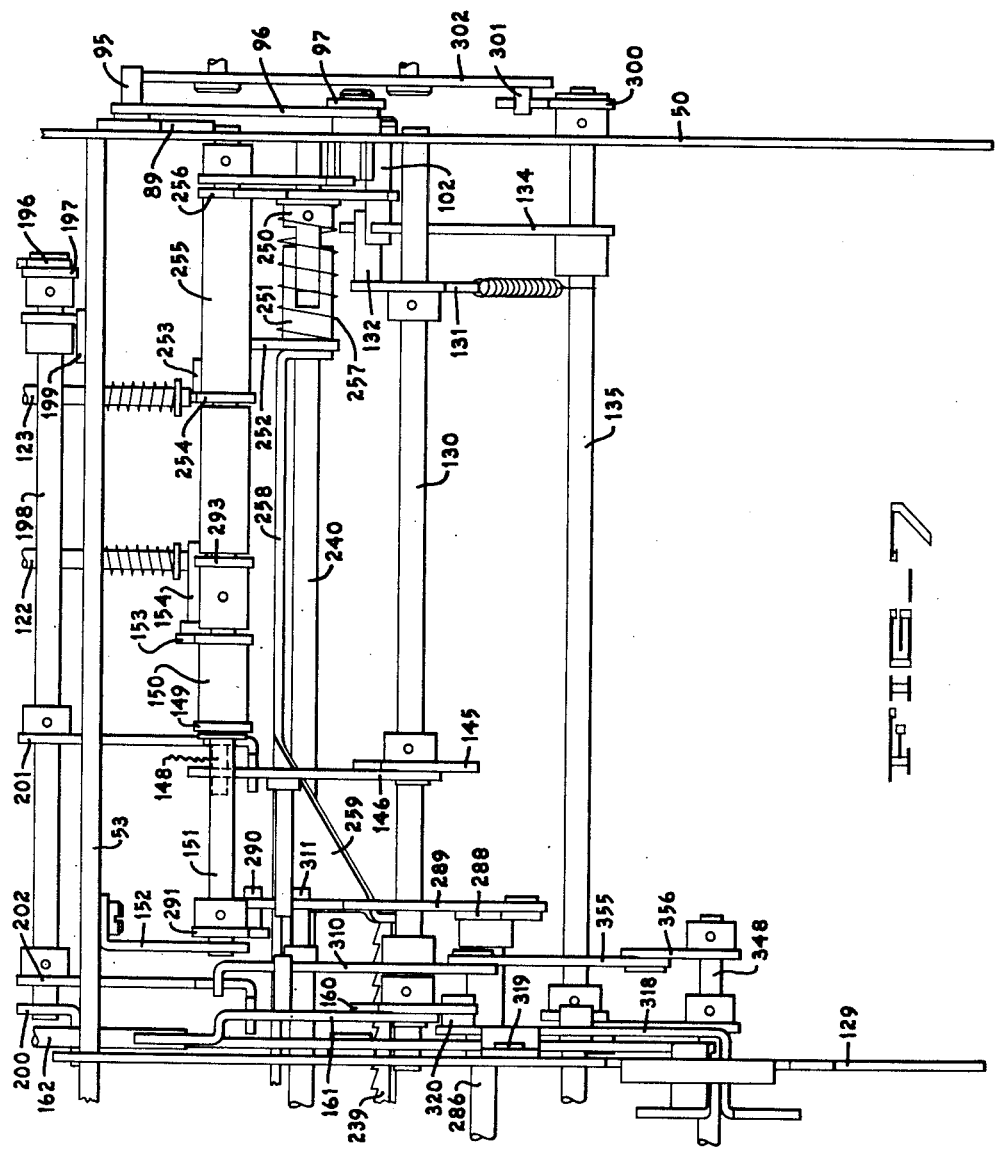

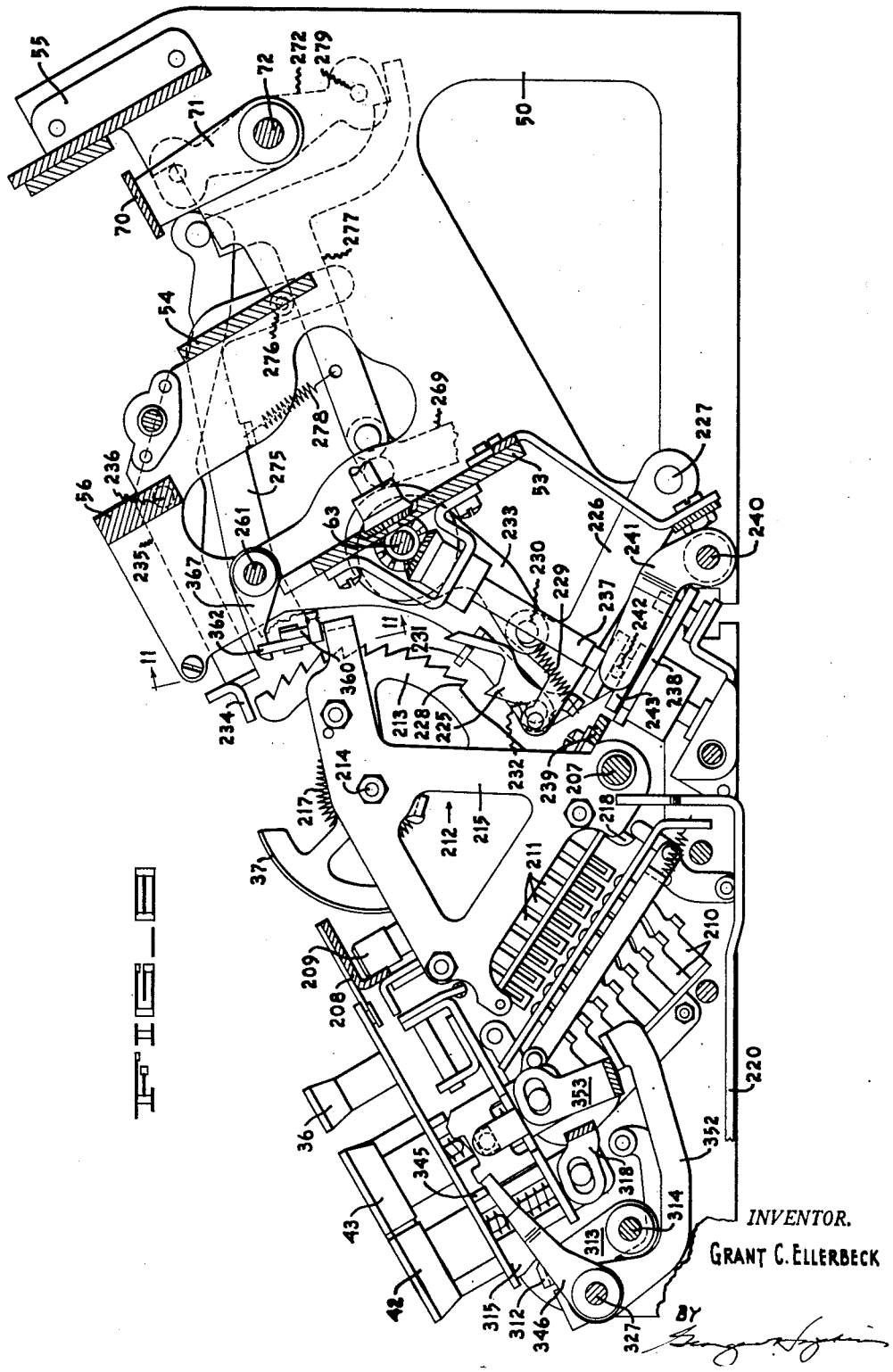

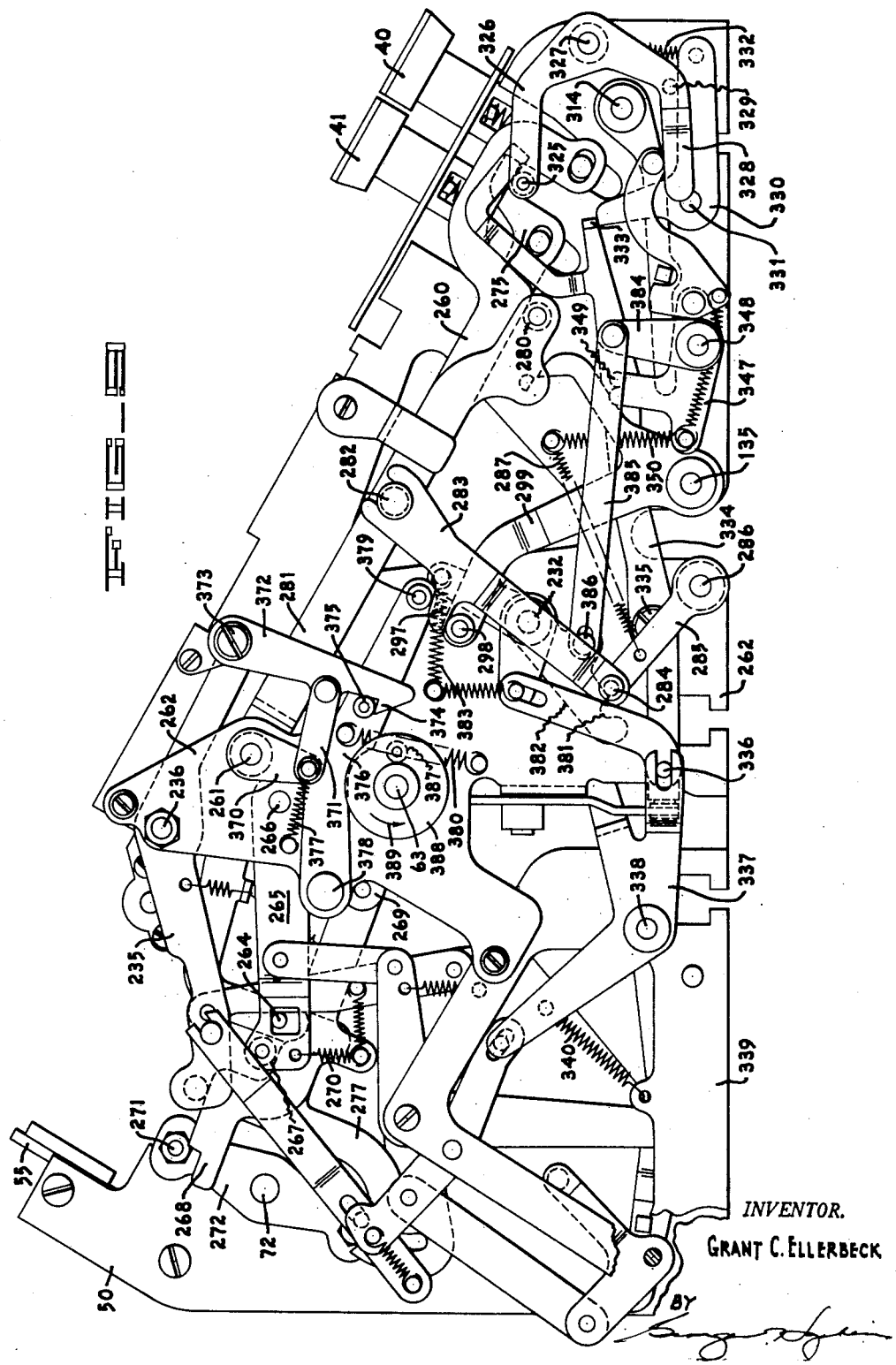

April 7, 1953     G. C. ELLERBECK     2,634,053
TABULATION CONTROL INCIDENT TO INDEXING
A MULTIPLICATION FACTOR
Filed Oct. 5, 1948                       8 Sheets-Sheet 8
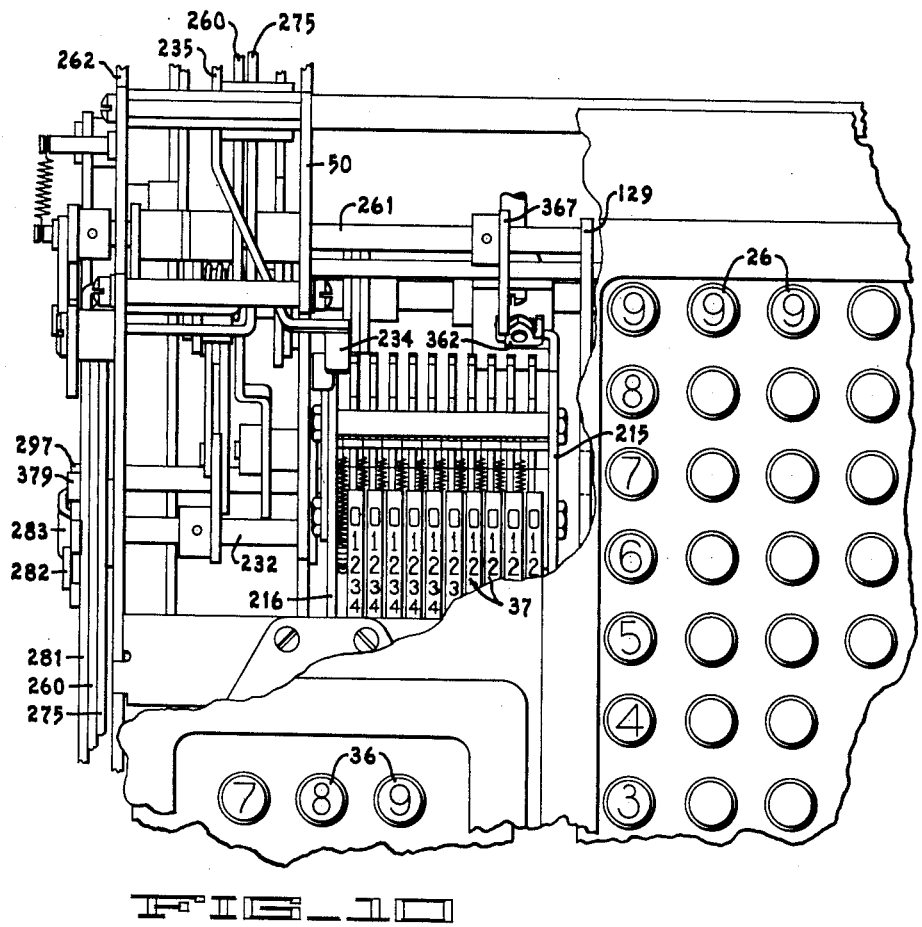
FIG_10
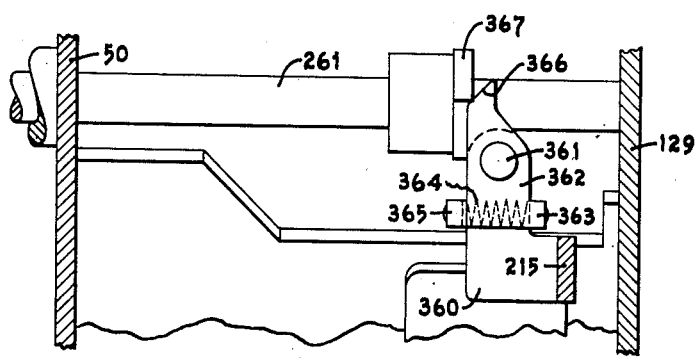
FIG_11
*INVENTOR.*
GRANT C. ELLERBECK
BY Patented Apr. 7, 1953

2,634,053

UNITED STATES PATENT OFFICE 2,634,053

TABULATION CONTROL INCIDENT TO INDEXING A MULTIPLICATION FACTOR

Grant C. Ellerbeck, Hayward, Calif., assignor to Friden Calculating Machine Co., Inc., a corporation of California Application October 5, 1948, Serial No. 52,895

10 Claims. (Cl. 235—63)

This invention relates to a control mechanism for calculating machines and more particularly to a mechanism for causing the accumulator carriage to be shifted to a predetermined position when the first digit of a multiplication factor is entered on the keyboard.

The present invention is an improvement on a calculating machine of the type disclosed in the following U. S. patents: No. 2,229,889, issued to Carl M. Friden on January 28, 1941; No. 2,371,752, issued to Carl M. Friden on March 20, 1945; and No. 2,399,917, issued to Carl M. Friden et al. on May 7, 1946. In these patents, No. 2,229,889 discloses the basic mechanism of the machine while Nos. 2,371,752 and 2,399,917 have to do with an automatic multiplication mechanism for machines of the type disclosed in the basic patent.

As fully shown and described in the above-mentioned patents, multiplication operations are performed by first setting the multiplicand on the amount keyboard and the multiplier on the ten multiplier keys located to the left of the amount keyboard after which one of the multiplier control keys is depressed. Upon depression of a control key, the accumulator carriage will be shifted to its extreme left hand position. After the carriage has reached this position, the automatic multiplication mechanism will immediately be rendered effective so as to cause the multiplicand to be multiplied by each digit of the multiplier, the accumulator carriage shifting one ordinal space to the right after multiplication by each digit of the multiplier has been effected.

It is an object of the present invention to further improve on the automatic multiplication mechanism disclosed in the previously mentioned patents by reducing the time required to effect multiplication of one number by another.

Another object of the invention is to provide a mechanism for causing the accumulator to be moved to a predetermined position relative to the actuating mechanism of the machine in response to the entry of the first digit of a multiplication factor.

A further object of the invention is to provide a mechanism for causing shifting of the accumulator to a predetermined position relative to the actuating mechanism in response to movement of the multiplier pin carriage away from its home position.

Still another object of the invention is to provide means controlled by the multiplier pin carriage for initiating operation of the machine and engaging the power shift mechanism so as to cause shifting of the accumulator carriage upon the entry of the first multiplier digit.

Still a further object of the invention is to provide a power setting means which is operable under the control of the multiplier pin carriage to initiate cycling of the machine and engage the left shift clutch so as to cause the accumulator carriage to be shifted to its extreme left hand position.

With these and other objects in view, which will become apparent from reading the following description, the invention includes various novel combinations of parts and features of design which are incorporated in the present embodiment of the invention hereinafter to be described.

With reference to the accompanying drawings in which:

Fig. 1 is a plan view of the calculating machine showing the arrangement of the various keys and dials and the general outward appearance of the machine.

Fig. 2 is a cross section through the machine taken along the line 2—2 in Fig. 1 with the carriage removed.

Fig. 3 is a cross-sectional view of the carriage taken along the line 3—3 in Fig. 1.

Fig. 4 is a sectional view through the machine taken along the line 4—4 in Fig. 1.

Fig. 5 is a rear view of the upper portion of the machine with the covers and certain portions of the mechanism removed.

Fig. 6 is a section taken along the line 6—6 in Fig. 5 showing a portion of the carriage shifting mechanism.

Fig. 7 is a plan view showing certain of the transverse control shafts of the machine.

Fig. 8 is a sectional view taken along the line 8—8 in Fig. 1 and showing the multiplier pin carriage and certain of the operating mechanism therefor.

Fig. 9 is a section taken along line 9—9 in Fig. 1 showing a portion of the automatic multiplication control mechanism.

Fig. 10 is a plan view of the upper left hand corner of the machine with certain parts removed so as to more clearly illustrate the mechanism.

Fig. 11 is a section taken along the line 11—11 in Fig. 8 showing a detail of the mechanism shown in Fig. 10.

General description

Referring to Fig. 1 the machine in which the present invention is incorporated includes a body portion 20 in which the actuating, selecting and control mechanisms are mounted and an accumulator carriage 21 which is mounted for endwise shifting movement transversely of the body portion 20 and which carries numeral wheels 22 and 23 of the accumulator and revolutions counter respectively. Carriage 21 may be shifted by power in either direction by manipulation of a left shift key 24 and a right shift key 25 located to the right of the amount keyboard.

Numerical values may be entered into the machine by the depression of appropriate numeral keys 26 of the customary amount keyboard, the keys 26 in each row being releasable individually by depression of the ordinal clear key 27 for that particular row, or collectively by depression of a keyboard clear key 28. The various values entered in the machine may be registered additively or subtractively on the accumulator numeral wheels 22 by the depression of a plus key 30 or a minus key 31 respectively. If it is desired that the keyboard be cleared after a single registration is made in the accumulator, an add key 32 may be depressed and latched down in the well-known manner.

Amounts contained in the numeral wheels 22 and 23 may be removed therefrom, that is, the numeral wheels may be reset to zero, by manipulation of the respective manually operable reset knobs 33 and 34, which are mounted for lateral sliding movement in the framework of the carriage. Alternatively, the wheels 22 and 23 may be zeroized by power through the depression of a return clear key 35.

The machine is adapted to perform automatic division operations by manipulation of a division control lever 39 which sets into operation a dividing mechanism of the type disclosed in U. S. Patent No. 2,327,981, issued to Carl M. Friden on August 31, 1943. Automatic multiplication operations can be performed on the present machine by depression of the appropriate multiplier selection keys 36 so as to set up the desired multiplier factor as indicated on the dials 37 which may be viewed through a window 38 provided in the front cover of the machine. The multiplication operation may be initiated by depression of one of the multiplication control keys 40, 41 or 42 which will cause the carriage 21 to be shifted to its extreme left-hand position after which the multiplicand set up on the amount keys 26 will be multiplied digit by digit by the multiplier indicated on the dials 37. If, for any reason it should become desirable to clear the multiplier dials 37, a multiplier correction key 43 may be depressed which will initiate a machine operation in which the multiplier setup mechanism will be normalized.

Selecting and actuating mechanism

The operating mechanisms contained within the body portion 20 of the machine are in the main supported by a left side frame 50 (Fig. 2) and a right side frame 51 (Fig. 4) which are mounted on a base 52 (Fig. 2) and are interconnected by various cross frame members including cross bars 53, 54, 55 and 56.

The values to be entered into the accumulator numeral wheels 22 may be determined by means of a plurality of similar orders of selecting mechanisms associated with the amount keys 26.

As shown in Fig. 2, each bank of amount keys 26 cooperates with a pair of similar value selecting slides 57 mounted for endwise movement by a suitable supporting linkage including links 58 and extending through suitable slots in cross bar 53. Each selecting slide 57 is connected at its rear end with a ten-tooth gear 59 slidably and non-rotatably mounted on a longitudinally extending square shaft 60 whereby movement of slide 57 serves to position its associated gear 59 on shaft 60 with respect to a series of stepped teeth provided on an associated actuating cylinder 61. For each adjacent pair of key banks there is provided a longitudinally extending actuating shaft 62 on which is mounted a pair of actuating cylinders 61. Each actuating shaft 62 is suitably journalled in cross bars 53 and 54 and has a suitable bevel gear connection with a transverse power shaft 63. The shaft 63 is cyclically unidirectionally operated by means of a clutch controlled driving means, hereinafter to be described, so as to provide a single path of power flow from the driving motor of the machine.

Each of the square shafts 60 is suitably journalled in the cross bars 53, 54 and 55 and is provided on its rear end with a slidably but non-rotatably mounted sleeve 64 to which are secured a ten-tooth add gear 65 and a ten-tooth subtract gear 66. These gears are adapted to cooperate with a ten-tooth bevel gear 67 (Fig. 3) secured to the lower end of each accumulator numeral wheel shaft 68. In the normal condition of the machine, the bevel gears 67 lie midway between the add-subtract gears 65, 66 so as to permit lateral shifting of the carriage, the gears 67 being free in this case to move through the space existing between the gears 65, 66. In order to enable an amount set up on the keys 26 to be added into the accumulator numeral wheels 22, the sleeve 64 and gears 65, 66 may be shifted toward the rear of the machine so as to engage the add gears 65 with the gears 67. This shifting is accomplished by means of a flat bail 70 extending transversely of the machine and lying within the space provided between the add-subtract gears 65, 66. The bail 70 is supported at either end on a pair of similar arms 71 secured to a transverse gate shaft 72 journalled between the side frames 50 and 51. The shaft 72 may be rocked clockwise in a manner hereinafter to be described to cause engagement of the add gear 65 with the gears 67, or counter-clockwise so as to result in engagement of gears 66 with gears 67.

During additive and subtractive registration of values on numeral wheels 22 a suitable transfer mechanism may be provided for effecting a tens-carry from one wheel to the next, one such mechanism being illustrated in aforementioned Patent No. 2,229,889.

Plus and minus keys

As previously stated, the plus and minus keys 30 and 31 are adapted to control the positive and negative registration in the accumulator and for this purpose may be connected by a suitable mechanism not disclosed herein, but fully shown and described in said Patent No. 2,229,889, for effecting clockwise and counter-clockwise rocking of shaft 72 whereby plus key 30 serves to mesh add gears 65 with the gears 67 on the lower ends of the numeral wheel shafts 68 and minus key 31 serves to mesh subtract gears 66 with the gears 67. The plus and minus keys also serve to engage the clutch and close the motor circuit by means of a mechanism not shown herein, but fully shown and described in Patent No. 2,229,889.

Drive mechanism

In order to effect registration in the accumulator of the values set up on the amount keys 26 the actuating shafts 62 are operable in a cyclic manner by means of a clutch controlled drive from the electric motor of the machine. As shown in Fig. 2, an electric driving motor 80 is secured to the base of the machine and is provided with an armature shaft 81 to which is secured a pinion gear 82 (Fig. 4) which meshes with an idler gear 83 which in turn meshes with a large gear 84 journalled on the transverse shaft 63. The gear 84 is provided with a hub 85 to which is secured a driving clutch element or ratchet 86. A driven clutch element 87 is secured to the shaft 63 and has pivoted thereon a spring-urged clutch pawl 88 which is provided with a tooth for engagement with the teeth of the ratchet 86 for establishing the drive connection. Pawl 88 is normally urged in a drive-engaging direction, but is restrained in the open or full cycle position by means of a clutch control lever 89 pivoted on a screw 90 secured to the right side frame 51. The lever 89 carries a pivoted roller 91 which seats in a depression on the driven clutch element 87 in the full cycle position thereof and in other positions maintains the lever 89 in its clutch engaging position. It is seen, therefore, that one or more cycles of the actuating shafts 62 may be determined by proper control of the lever 89.

Simultaneous with the movement of the lever 89 in a clockwise direction so as to cause the clutch to be engaged, the electric circuit for the driving motor 80 is established. For this purpose a pin 95 on the upper end of the lever 89 is connected by a link 96 with the upper end of a lever 97 pivotally mounted on a screw 98 secured to the side frame 51. The lower end of the lever 97 is provided with a bifurcation which engages with a pin 99 provided in the upper end of a lever 100 pivotally mounted on a screw 101 secured to the right side frame 51. On its lower end the lever 100 is provided with a suitably insulated pin 102 which bears against one leaf of a leaf spring contact 103. Thus, clockwise movement of the clutch control lever 89 causes similar rocking movement of the lever 97 and counter-clockwise movement of the lever 100 so as to cause the pin 102 to force the contacts 103 into engagement with one another and thereby close the electrical circuit for the motor. It will be observed that the roller 91, in maintaining the control lever 89 in clutch engaging position when the actuating shafts 62 are out of full cycle position, also serves to maintain the contacts 103 closed so that the motor circuit can be interrupted only in the full cycle position of the parts.

Carriage shift mechanism

As mentioned above, the accumulator carriage 21 may be shifted from one ordinal position to another in either direction under power by means of the shift control keys 24 and 25. Toward this end the carriage is provided with a hollow frame bar 110 (Fig. 3) in which the numeral wheels 68 are journalled and to which is pivotally secured a toothed shift rack 111 extending lengthwise of the carriage along the rear side thereof. The rack 111 is provided with ordinally spaced notches 112 (see Fig. 5) which are adapted to be engaged by a pair of shift pins 113 mounted on a shift gear 114 suitably journalled on the cross bar 55. Shift gear 114 may be rotated at will in either direction through suitable gear connections 115 with a pair of similar gear sleeves 116 and 117. These sleeves are each located in axial alignment with two adjacent actuating shafts 62 (Fig. 6) and have similar engageable drive couplings 118, 119 whereby the actuating shafts 62 may be operatively connected with the gear sleeves 116, 117. The couplings 118, 119 are shiftable to and from the drive engaging position by means of forks 120 and 121 secured to the rear ends of a pair of shift rods 122 and 123. Rearward movement of the shift rod 122 will cause the coupling 118 to be moved into driving relation with respect to the gear sleeve 116 so as to cause a left shift operation of the carriage 21 to take place when the actuating shafts 62 are rotated by the motor. In a similar manner the shift rod 123, when moved toward the rear of the machine, will cause the collar 119 to be moved into driving relation with respect to the gear sleeve 117 and thereby cause a right shift of the carriage when the machine is cycled. For further particulars of the carriage shift mechanism reference is made to Patent No. 2,294,083 issued to Carl M. Friden on August 25, 1942.

Power clear mechanism

In the present machine means is provided for restoring the machine to normal condition between successive clearing operations by causing the carriage to be shifted to a predetermined position and then effecting a resetting of either the accumulator numeral wheels or the revolutions counter numeral wheels or both of them depending upon the angular setting of the control knobs 33 and 34 (Fig. 1). This operation is carried out by power driven mechanism which is under the control of a manually operable carriage return and resetting key 35. The mechanism for accomplishing this result is of the same type as that disclosed in the aforesaid Patent No. 2,294,083.

The return and clear key 35 (Fig. 4) is effective when depressed to connect both the resetting mechanism and the carriage shifting mechanism with the power driven actuating shafts 62. The key 35 is mounted for vertical sliding movement on the side frame 51 and is connected by means of a suitable linkage (not shown herein but fully shown and described in Patent No. 2,294,083) with a carriage shift and resetting shaft 130 (Fig. 7) extending transversely across the machine and journalled between the side frame 50 and a right side plate 129 for the multiplier unit.

In order to engage the drive and cause cyclic operation of the actuating shafts 62 the shaft 130 has secured thereto an arm 131 (Figs. 4 and 7) which is provided at its lower end with a pin 132 which lies in engagement with the upper edge of a finger 133 provided on an arm 134 journalled on a cycle initiating shaft 135 extending transversely of the machine and journalled in the frame work thereof. The arm 131 and shaft 130 are normally held in their counter-clockwise (Fig. 4) or inactive positions by means of a tension spring 136 but may be rocked clockwise upon depression of the return and clear key 35. The arm 134 is also provided with an upwardly directed finger 137 which bears against the insulated pin 102 on the lever 100 whereby clockwise movement of the arm 134 resulting from clockwise movement of the arm 131 will cause the pin 102 to be moved toward the rear of the machine thereby closing the contacts 103 and energizing the electric motor. At the same time the clutch control lever 89 will be disengaged from the pawl 88 by means of the linkage consisting of levers 100 and 97 and link 96 so as to cause the clutch to be engaged.

In order to cause a left shifting operation of the carriage when the key 31 is depressed, the shaft 130 has secured thereto an arm 145 (Figs. 2 and 7) to which is pivoted a pusher link 146 urged downwardly by spring 147. The rear end of the link 146 is provided with a notch which is urged by spring 147 into engagement with a pin 148 (Fig. 7) mounted on the lower end of an arm 149. This arm is secured to a sleeve 150 which is rotatably journalled on a left shift shaft 151 which is supported at its right hand end in the right side frame 50 and at its left hand end in a bracket 152 secured to the cross bar 53. Secured to the right hand end of the sleeve 150 is an arm 153 which carries a pin 154 bearing against the forward end of the left shift push rod 122. Hence, when the shaft 130 is rocked clockwise, as viewed in Fig. 2, the pusher link 146 will be moved rearwardly so as to rock the sleeve 150 counter-clockwise. The resulting rearward movement of the pin 154 will move the push rod 122 toward the rear of the machine and engage the coupling 118 (Fig. 6) with the gear sleeve 116 so as to cause shifting of the carriage toward the left.

The rocking movement of shaft 130 also serves to initiate a power clearing operation of the accumulator and resolutions counter numeral wheels. For this purpose there is secured to the shaft 130, near the left hand end thereof, an arm 160 (Fig. 7) to which is pivotally secured a pusher link 161 which is urged downwardly by a spring similar to the spring 147 for the pusher link 146. The link 161 is notched at its rear end so as to enable it to operatively engage with the forward end of a push rod 162 for the power clear mechanism. As shown in Fig. 5, the push rod 162 carries at its rear end a fork 163 similar to the forks 120 and 121 for the shift mechanism which fork engages with a coupling similar to the couplings 118 and 119 of the shift mechanism. The coupling operated by the fork 163 lies in axial alignment with one of the actuating shafts 62, the same as the couplings 118 and 119 and serves to connect this actuating shaft with a sleeve 164 to which is secured a power clear cam 165. This cam cooperates with a roller 166 pivotally mounted on an arm 167 which is pivoted at 168 to the cross bar 55. The arm 167 is provided at its upper end with an elongated slot 169 which engages with a roller 170 carried by a pawl 171 pivotally mounted at 172 on a slide 173. The slide 173 is mounted for endwise sliding movement on cross bar 55 by means of a pair of supporting and guide brackets 174. When the carriage is in its extreme left hand position, as illustrated in Fig. 5, the pawl 171 is in position to engage with the end of an arm 175 pivoted at 176 on a bracket 177 secured to a resetting slide 178. This slide has an L shaped cross section and is mounted for endwise sliding movement on the carriage 21 by means of elongated slots formed therein which cooperate with studs 179 mounted on the carriage frame.

The arm 175 has pivoted thereto at 180 a pass-by pawl 181 which is urged in a clockwise direction, as viewed in Fig. 5, by a spring 182 so as to normally maintain the pawl in engagement with a stud 183 mounted on the arm 175. This pawl is adapted to cooperate with a fixed ledge 184 supported on the cross bar 55 so as to lift the arm 175 out of the path of the pawl 171 as the carriage moves into its extreme left hand position. However, when the carriage reaches its extreme left hand position, the pass-by pawl 181 will have moved beyond the ledge 184 as shown in Fig. 5 so as to permit the end of the arm 175 to be moved down into the path of the pawl 171 by the spring 182 so that upon movement of the slide 173 to the left, as viewed in Fig. 5, the pawl 171 will engage the arm 175 and reciprocate the resetting slide 178 so as to cause a resetting operation of the numeral wheels 22 and 23. The reciprocation of the slide 178 is effected during the first cycle which occurs with the carriage in its extreme left hand position as shown in Fig. 5.

The slide 178 may be operatively related to either the resetting rack bar 185 (Fig. 3) for the accumulator numeral wheels 22 or the resetting rack bar 186 for the revolutions counter numeral wheels 23 or both of them depending upon the angular setting of the resetting knobs 33 and 34 (Fig. 1). For a more complete disclosure of this portion of the mechanism of the machine, reference is made to Patent No. 2,294,083 referred to above.

After the carriage has reached its extreme left hand position, as shown in Fig. 5, means is provided for disabling the pusher links 146 and 161 on the next cycle of operation of the machine so as to terminate the operation of the carriage shifting means and the power clearing mechanism. For this purpose, an override pawl 190 is pivotally mounted on a screw 191 secured to the toothed rack 111. The pawl 190 is resiliently urged into engagement with a stud 192 mounted on the rack 111 by means of a tension spring 193. However, when the shift gear 114 is rotated with the carriage in the position shown in Fig. 5, the shift pin 113 lying beneath the end of the pawl 190 will cause the pawl to be rocked counter-clockwise, as viewed in Fig. 5, and so cause a slide 194 mounted on the cross bar 55 to be moved downward so as to rock a bell-crank 195 in a clockwise direction as viewed in Fig. 4. This bellcrank is connected by a link 196 with an arm 197 secured to a shaft 198 (see also Fig. 7) which is journalled in brackets 199 and 200 secured to the cross bar 53. Secured to the shaft 198 are two lifter arms 201, 202 which lie beneath the pusher links 146 and 161 respectively. Hence, when the shaft 198 is rocked clockwise, as viewed in Fig. 4, the lifter arms 201 and 202 will be elevated so as to lift the pusher links out of engagement with pin 148 and push rod 162 thereby terminating the operation of the carriage shifting mechanism and the power clearing mechanism.

*Multiplier mechanism*

As previously mentioned in connection with Fig. 1, the multiplier mechanism comprises a ten key keyboard including ten numeral keys 36 and four multiplication control keys 40, 41, 42 and 43. The numeral keys 36 are operatively associated with a group of pin setting members 210 (Fig. 8) which lie beneath a group of settable stop pins 211 mounted in a pin carriage 212. The pin carriage 212 is guided for transverse movement in the machine by means of a rod 207 and a rail 208 secured to the framework of the machine. The carriage 212 is mounted for sliding movement on the rod 207 and carries rollers 209 which engage with a down-turned edge of the rail 208. The pins 211 control the setting of a plurality of ordinally arranged multiplier racks 213 which are pivotally mounted on a rod 214 supported at either end in the side frames 215 and 216 (see also Fig. 10) of the pin carriage. The racks 213 are normally urged to rotate in a clockwise direction about the rod 214 by means of individual springs 217 but are normally restrained against such movement by means of a zero latch 218 which, however, is disabled whenever one of the numeral keys 36 is depressed. Hence, upon depression of one of the keys 36 its corresponding stop pin 211 will be set and the zero stop 218 will be disabled thereby permitting the multiplier rack 213 to be rotated by spring 217 to a position determined by the stop pin 211. At the same time the pin carriage will be permitted to escape toward the left, as viewed in Figs. 1 and 10, by means of a conventional escapement mechanism as disclosed in Patent No. 2,371,752. The pin carriage is yieldably urged to move toward the left by means of a spring 219 (Fig. 1) which is secured at one end to the right side frame 51 and at the other end to the forward end of a pivoted lever 220 (see also Fig. 8) which is provided at its rear end with an upward extension bearing against the right side frame 215 of the multiplier pin carriage. As mentioned above, however, left-hand movement of the pin carriage is controlled by the escapement mechanism therefor so as to enable the spring 219 to move the carriage one ordinal space to the left each time a numeral key 36 is depressed.

At the conclusion of the setting of a multiplier factor into the pin carriage 212 the multiplier racks 213 will be differentially set to positions representing the values of the digits of the multiplier factor. These positions of the rack 213 are utilized in a manner clearly disclosed in Patents No. 2,371,752 and 2,399,917, to control the number of registrations of the multiplicand in the various ordinal positions of the accumulator and also to cause the accumulator to be shifted one ordinal position to the right following multiplication by each multiplier digit. At the same time the pin carriage will be shifted one step to the right so that the next higher order rack 213 will be moved into controlling position so as to cause multiplication by the next multiplier digit.

The means for stepping the multiplier racks 213 back to their zero positions is partially shown in Fig. 8 and includes a toothed pawl 225 which is pivotally mounted on the forward end of an arm 226 pivoted in the framework of the machine at 227. The pawl is normally urged into engagement with the rack teeth 228 of the multiplier rack located in active position by means of a spring 229 stretched between a tail formed on the pawl 225 and a pivot pin 230. The pawl 225 is normally held out of engagement with the teeth 228 of the rack 213 by means of a holding pawl 231 mounted on the right-hand end of a cross shaft 232. However, whenever a multiplication operation is initiated, the holding pawl 231 is rocked counter-clockwise away from the upstanding finger on the pawl 225 thereby permitting this pawl to move into operative position with respect to the rack teeth 228.

The operating arm 226 for the pawl 225 is oscillated once on each cycle of operation of the transverse shaft 63, this being accomplished by means of an eccentric secured to the shaft 63 which serves to reciprocate an arm 233 which is connected at its lower end to the pivot pin 230 on the arm 226. When the rack 213 has reached its zero position the upper end of the rack will contact an ear 234 provided on the forward end of a lever 235 pivoted in the framework of the machine at 236. The resulting rocking movement of the arm 235 will serve to engage the right shift mechanism for the accumulator carriage so as to cause the accumulator to be shifted one ordinal space to the right preparatory to multiplication by the next multiplier digit and also to cause the multiplier pin carriage to be moved one ordinal space to the right so as to bring the next multiplier rack 213 into position with respect to the toothed pawl 225.

A portion of the mechanism for shifting the pin carriage is shown in Fig. 8 and comprises a power shaft 237 which is provided with a bevel gear connection with the transverse shaft 63 so that it will be operated in synchronism with the main operating mechanism of the machine. The shaft 237 has secured at its lower end an eccentric (not shown) which serves to oscillate a feed pawl 238 which may be shifted a short distance in the direction of the axis of the shaft 237. When the pawl is in the position shown in Fig. 8 it lies just beneath and out of operative position with respect to a feed rack 239 secured to the pin carriage 212. However, when the multiplier rack 213 is moved into zero position so as to cause rocking of the arm 235, means is brought into play as shown in Patent No. 2,399,917 which causes clockwise movement of a shaft 240 which has secured thereto an arm 241 bearing a pin 242 which engages between the flanges of a collar 243 secured to the feed pawl 238. The pawl 238 will thereby be raised into operative position with respect to the feed rack 239 and so cause the pin carriage to be moved one ordinal space to the right.

Simultaneously with the shifting of the pin carriage one ordinal space to the right, the accumulator carriage 21 is likewise shifted so as to prepare the machine for multiplication by the next multiplier digit. The shaft 240 (see Fig. 7) has secured thereto near its right-hand end a driving clutch element 250 which engages with a driven element 251 journalled on the shaft 240. Secured to the element 251 is a right shift operating arm 252 which normally lies to the right of a pin 253 mounted on an arm 254 which lies in engagement with the forward end of the right shift push rod 123. The arm 254 is secured to a sleeve 255 which is journalled on the left shift shaft 151 and has secured to its right-hand end an arm 256 which is adapted to be rocked by the right shift key 25 when this key is depressed. The member 251 and arm 252 are normally urged toward the left, as viewed in Fig. 7, by means of a compression spring 257 encircling the clutch elements 250 and 251. Such movement is normally restrained, however, by means of a slide member 258 which is journalled on the shaft 240 and slidable laterally thereon. The left-hand end of the slide 258 is provided with an off-set portion 259 which has an ear lying in contact with the right hand end of the feed rack 239 for the pin carriage. Thus, when the pin carriage is permitted to escape to the left upon the depression of the multiplier numeral keys 36, the slide 258, the arm 252 and the driven member 251 of the clutch will be moved to the left by the spring 257 so as to bring the arm 252 into operative relationship with the pin 253. Hence, when the shaft 240 is rocked clockwise as viewed from the right of the machine, by means of the mechanism shown in Patent No. 2,399,917, the upper end of the arm 252 will engage the pin 253 and cause the push rod 123 to be moved toward the rear thereby engaging the right shift mechanism.

Multiplication operations are initiated by means of the control keys 40, 41 and 42 (Figs. 1, 8 and 9). When any one of these three keys is depressed, means is set into operation for energizing the motor and engaging the clutch and also setting the left shift mechanism into operation so as to move the carriage to its extreme left-hand position after which the multiplication of the multiplicand by each digit of the multiplier will be effected with right shifting of the carriage after multiplication by each multiplier digit is accomplished. The multiplication key 40 is effective to engage the add gears 65 with the gears 67 so as to cause the product to be registered positively on the accumulator numeral wheels 22. Depression of control key 41 will result in the subtract gears 66 being engaged with the gears 67 so as to cause the product to be registered negatively on the numeral wheels 22. Control key 42 when depressed results in a positive registration of the product on the numeral wheels 22 but, prior to the outset of the multiplication operation, causes a clearing or resetting operation of the numeral wheels so as to erase any previous registration thereon.

As shown in Fig. 9, the control key 40 is mounted for vertical sliding movement in the framework of the multiplier keyboard and has a pin and slot connection with a lever 260 which is pivoted on a shaft 261 which, as shown in Fig. 10, is supported between a left side plate 262 of the multiplier unit and the right side plate 129 thereof. At its rear end the lever 260 bears a stud 264 which passes through a rectangular aperture provided in the rear end of an arm 265 pivoted at 266 on the left side plate 262. The arm 265 is provided with a roll 267 which bears against the upper edge of a pitman 268 pivotally connected at its forward end to a power setting arm 269. The roll 267 is resiliently urged into engagement with the upper edge of the pitman 268 by means of a spring 270 stretched between the pitman and the arm 265. Hence, when the rear end of the lever 260 is raised upon depression of the key 40, the pitman 268 will be resiliently urged upwardly by the spring 270 so as to bring the notched rear end of the pitman into engagement with a stud 271 mounted in the upper end of an arm 272 secured on the left-hand end of the add-subtract control shaft 72. Hence, when the upper end of the power setting arm 269 is moved toward the rear of the machine during a multiplication operation by means not shown herein but fully shown and described in Patents No. 2,371,567 and 2,399,917, the shaft 72 will be rocked clockwise as viewed from the right of the machine so as to move the add gears 65 into engagement with gears 67.

The control key 41 is, like the key 40, slidably mounted for vertical movement in the framework of the multiplier keyboard and is provided with a pin and slot connection with a lever 275 also pivoted on the shaft 261 and which, as shown in Fig. 8, is provided on its rear end with a roll 276 bearing against the upper edge of a pitman 277 which, like the pitman 268, is pivoted at its forward end to the power setting arm 269. The pitman 277 is normally held in engagement with the roll 276 by means of a spring 278 stretched between the lever 275 and the pitman so that when the rear end of the lever 275 is raised upon depression of the key 41 the rear end of the pitman will be elevated so as to bring the notch formed therein into engagement with a stud 279 mounted in the lower end of the arm 272. Rearward movement of the power setting arm 269 will thereby cause the shaft 72 to be rocked counter-clockwise as viewed in Fig. 8 and so cause the subtract gears 66 to be moved into engagement with the gears 67 on the numeral wheel shafts 68.

The levers 260 and 275 are both arranged to lie above a roll 280 (Fig. 9) mounted on the forward end of an arm 281 which is pivoted on the shaft 261. The arm 281 bears a headed stud 282 which engages with the bifurcation provided on the upper end of a link 283 which, at its lower end, is journalled on a pin 284 mounted on the end of an arm 285 secured to the left-hand end of a left shift shaft 286 (see also Fig. 7) which is journalled between the left side plate 262 and the right side plate 129 of the multiplier unit. Consequently, upon depression of either of the keys 40 or 41 the shaft 286 will be rocked counter-clockwise, as viewed in Fig. 9, against the urgency of a spring 287 stretched between the arm 285 and a stud on the plate 262.

Referring now to Fig. 7, it will be seen that the shaft 286 has secured to its right hand end an arm 288 (see also Fig. 2) which is pivotally connected with the forward end of a pusher link 289 provided at its rear end with a notch which is biased by a spring 292 into engagement with a pin 290 mounted on an arm 291 secured to the left shift shaft 151. Consequently, when the shaft 286 is rocked clockwise (as viewed in Fig. 2) upon depression of either of the keys 40 or 41, the left shift shaft 151 will be rocked counter-clockwise and thereby cause the lower end of an arm 293 secured to this shaft to engage with the pin 154 and move the left shift push rod 122 toward the rear of the machine thereby engaging the left shift mechanism.

Referring again to Fig. 9, it will be noted that the link 283 is provided with a rearwardly directed finger 297 which lies above a roll 298 mounted on an arm 299 which is secured to the cycle initiating shaft 135. Referring to Fig. 4, the shaft 135 has secured to its right-hand end an arm 300 provided at its upper end with a bifurcation engaging with a pin 301 mounted on the forward end of a slide 302. This slide is guided for endwise movement on the machine frame by means of elongated slots therein which cooperate with frame studs 303. The rear end of the slide 302 bears against the pin 95 on the clutch control lever 89 so that when the shaft 135 is rocked clockwise upon depression of either of the keys 40 or 41, the clutch will be engaged and the motor energized by the closing of the contacts 103. Hence, when either of the keys 40 or 41 is depressed, a left shift operation of the carriage 21 will be initiated and will continue until the carriage reaches its extreme left-hand position whereupon the shaft 198 (Fig. 7) will be rocked by the override pawl 190 (Fig. 5) and the forward end of the lifter arm 202 (Fig. 7) will be raised so as to elevate the rear end of a lever 310 loosely journalled on the shaft 130. The lever 310 carries a stud 311 which lies beneath the pusher link 289 so that this link will be lifted off the pin 290 thereby terminating the left shift operation of the carriage.

The shafts 286 and 135 are held in their rocked positions after either of the keys 40 or 41 have been depressed by means of a key latch bail 312 (Fig. 8) which is provided with side arms 313 which are secured to a shaft 314 journalled between the left and right side plates 262 and 129 of the multiplier unit. The bail 312 cooperates with latch teeth 315 formed on the stems of the keys 40, 41, 42 and 43 so as to maintain these keys in their depressed positions until the end of the multiplication operation when the movement of the pin carriage 212 into its right-most position will cause the bail 312 to be moved forward and release the keys by means fully shown and described in Patent No. 2,399,917.

Means is provided whereby depression of the clear and multiply key 42 will likewise cause left-hand shifting of the carriage together with a resetting operation of the numeral wheels 22 and/or 23. Referring to Fig. 8, it will be observed that the lower end of the key 42 is joined by a pin and slot connection with a lever 318 (see also Fig. 2) which is pivoted at 319 to the right side plate 129. As shown in Fig. 7, the lever 318 is provided on its rear end with a stud 320 which lies beneath the arm 160 on the shaft 130 so that when the key 42 is depressed the pin 320 will be elevated thereby rocking the arm 160 and the shaft 130 so as to cause the push rods 162 and 122 for the power clear mechanism and left shift mechanism respectively, to be moved rearwardly thereby engaging these mechanisms for operation. At the same time the motor will be energized and the clutch engaged by means of the arm 131 secured to the shaft 130 in the manner previously described herein. When the carriage 21 reaches its extreme left-hand position, the override pawl 190 will cause the shaft 198 to be rocked whereby the lifter arms 201 and 202 will elevate the pusher links 146 and 161 so as to disable the power clear and left shift mechanisms.

Referring again to Fig. 9, it will be observed that the forward ends of levers 269 and 275 overlie a pin 325 mounted in the rear end of an arm 326 which is secured to a shaft 327 journalled between the right and left side plates 129 and 262. Integral with the arm 326 is another arm 328 which bears a stud 329 overlying the forward arm of a bellcrank lever 330 which is pivoted on the left side plate at 331. The forward end of the bellcrank lever is normally urged upwardly into engagement with the stud 329 by means of a tension spring 332 so as to normally maintain an upwardly extending arm of the lever 330 beneath an ear 333 formed on the forward end of a multiplication initiation lever 334. This lever is pivoted on a screw 335 secured to the left side plate 262 and at its rear end is provided with a pin 336 which engages with a bifurcation provided on the forwardly extending arm of a lever 337. This lever is pivoted at 338 to an auxiliary frame plate 339 and is normally urged to rotate in a counter-clockwise direction as viewed in Fig. 9 by means of a spring 340. The spring 340 thereby acts through the lever 337 and pin 336 to normally urge the lever 334 in a clockwise direction so as to maintain the ear 333 in contact with the upper end of the bellcrank lever 330. However, when either of the keys 40 or 41 is depressed the double armed member 326, 328 will be rocked counter-clockwise and the pin 329 thereon will cause the bellcrank lever 330 to be rocked clockwise against the urgency of the spring 332 so as to move the upwardly directed arm of the bellcrank lever from beneath the ear 333 on the lever 334. In a similar manner, when the key 42 is depressed, an ear 345 (Fig. 8) formed on the stem of the key will act on an arm 346 secured to the shaft 327 so as to rock the shaft in a counter-clockwise direction as viewed in Fig. 9 so as to rock the bellcrank 330 clockwise and release the lever 334.

The lever 334, however, will be maintained in the position shown in Fig. 9 by means of a latch 347 secured to a shaft 348 journalled between the right and left side plates 129 and 262 which latch is provided at its upper end with a notch lying beneath a pin 349 on the lever 334. The latch is normally held in the position shown in Fig. 9 with the notch underlying the pin 349 by means of a spring 350 stretched between the rear end of the latch and a stud on the left side plate 262. Hence, although the lever 334 will be freed from the restraining influence of the bellcrank 330 upon depression of any one of the keys 40, 41, or 42, the latch 347 will hold the lever inactive against the urgency of the spring 340 until the shaft 348 is rocked counter-clockwise so as to move the latch 347 from beneath the pin 349.

After the carriage 21 has reached its extreme left-hand position and the override pawl 190 has been oscillated thereby rocking the shaft 198 (Fig. 7) so as to raise the lifter arms 201, 202, the lever 310 journalled on the shaft 130 and formed over at its rear end so as to overlie the lifter arm 202 will be rocked counter-clockwise, as viewed from the right side of the machine, thereby drawing a link 355 pivotally connected thereto toward the rear of the machine. As shown in Fig. 2, the forward end of the link 355 is pivotally connected to an arm 356 which is secured to the right hand end of the shaft 348 so as to cause this shaft to be rocked counter-clockwise as viewed in Fig. 9 of the drawings. The latch 347 will thereby release the lever 334 to the influence of the spring 340 and the automatic multiplication mechanism will be set into operation in the manner fully shown and described in Patent No. 2,399,917.

As shown in Fig. 2, the multiplier correction key 43 is pivotally connected to a lever 353 pivotally mounted on the right side plate 129. The lever 353 carries a roll 354 which is adapted to co-operate with an inclined face provided on the upper end of an arm 357. This arm is secured to the cycle initiating shaft 135 and will cause this shaft to be rocked so as to initiate cycling of the machine when the key 43 is depressed.

The lever 353 is also arranged to overlie a stud 358 mounted on the upper end of an arm 359 secured to the shaft 348. Hence, when the key 43 is depressed, the shaft 348 will be rocked clockwise so as to remove the latch 347 from beneath the stud 349 on the lever 334.

As shown in Fig. 8, the lever 353 also overlies an ear formed on the rear end of an arm 352 secured to the shaft 327 on the left-hand end of which is secured the double-armed member 326, 328 (Fig. 9). It will therefore be seen that depression of the key 43 will remove the upwardly extending arm of the bellcrank lever 330 from beneath the ear 333 on the forward end of the multiplication initiating lever 334 so as to free this lever for clockwise movement under the influence of the spring 340. In this manner, a multiplication operation will be initiated by manipulation of the key 43. However, as explained in Patent No. 2,371,752, the multiplier correction key disables shifting of the accumulator carriage and does not exercise any control over the add and subtract pitmans 268 and 277 so that the gate shaft 72 remains in its neutral position. Hence, the product will not be registered in the accumulator wheels 22 and the racks 213 and pin carriage 212 will be normalized independently of the rest of the machine.

*Carriage shift from multiplier keys*

From the foregoing description it will be noted that the initiation of a carriage return operation does not take place until one of the multiplication control keys 40, 41 or 42 is depressed. In other words, during the time the multiplier is being set up on the multiplier numeral keys 36, the machine is at rest and nothing happens until the operator depresses one of these three control keys. In order to speed up the operation of the machine and make use of the idle time involved during the setting up of the multiplier on the pin carriage mechanism, a novel mechanism has been developed for causing the left shift operation of the carriage to take place simultaneously with the entry of the first multiplier digit into the pin carriage mechanism. It will be recalled that the pin carriage 212 is permitted to escape one ordinal position to the left under the influence of the spring 219 (Fig. 1) each time a selection is made by manipulation of one of the multiplier keys 36. This movement of the pin carriage is utilized for the purpose of initiating a left shift operation of the accumulator carriage when the first digit of the multiplier is entered.

As shown in Figs. 8, 10 and 11, the right side frame 215 of the pin carriage is provided with a formed-over ear 360 on which is pivoted at 361 a pass-by pawl 362. As shown in Fig. 11, this pawl is provided with a formed-over ear 363 which is normally held in engagement with one edge of the ear 360 by means of a spring 364 stretched between the ear 363 and an ear 365 bent-off from the ear 360. The pass-by pawl 362 is provided at its upper end with an inclined cam face 366 which cooperates with the forward end of an arm 367 pinned to the shaft 261. Hence, when the pin carriage escapes toward the left the cam face 366 will lift the arm 367 and rock the shaft 261 in a clockwise direction as viewed in Fig. 8 or in counter-clockwise direction as viewed in Fig. 9. When the pin carriage is restored toward the right near the end of a multiplication operation, the spring 364 will permit the pass-by pawl 362 to yield when it engages the arm 367 and pass beneath the arm so that it may once again assume the position shown in Fig. 11 when the machine is in its normal condition.

Referring to Fig. 9, the shaft 261 has secured thereto at its left-hand end an arm 370 which is connected by a link 371 with a latch 372 pivotally mounted on a screw 373 secured to the left side plate 262. The latch 372 is provided with a hooked nose 374 which engages beneath a roll 375 mounted on an actuating arm 376. The nose 374 is normally maintained beneath the roll 375 by means of a spring 377 connected between the rear end of the link 371 and a stud mounted in the left side plate 262. The arm 376 is pivotally mounted on the plate 262 at 378 and is provided at its forward end with a roll 379 which bears against the upper edge of the finger 297. The arm 376 is normally urged to rotate in a clockwise direction, as viewed in Fig. 9, by means of a relatively strong spring 380 stretched between the arm and a stud on the left side plate 262. Hence, when the shaft 261 is rocked counter-clockwise upon movement of the pin carriage from its home position to its first active position, the latch 372 will be rocked out of engagement with the roll 375 thereby releasing the arm 376 to the action of the spring 380. The roll 379 on the forward end of the arm will thereby force the pitman 283 downwardly so as to rock the left shift shaft 286 and the cycle initiating shaft 135 so as to commence a left-hand shifting operation of the carriage.

As the pitman 283 moves down, the pin 284 on the rear end of the arm 285 will move in front of a notch 381 formed in a latch 382 which is freely rotatable on the shaft 232. The latch will thereupon be rocked counter-clockwise by a spring 383 stretched between the upper end of the latch and a stud mounted in the left side plate so as to cause the notch 381 to engage the pin 284 and hold the arm 285 in its rocked position against the influence of the spring 287. The cycle initiating shaft 135 will likewise be held in its rocked position by means of the latch 382 and the left shift operation of the carriage will continue uninterrupted until the carriage reaches its extreme left hand position.

However, when the override pawl 190 is operated with the carriage in this position, the shaft 348 will be rocked counter-clockwise, as viewed in Fig. 9, thereby moving the upper end of an arm 384 secured to the shaft toward the rear of the machine. The arm 384 is connected by a link 385 with the latch 382 by means of a pin and slot connection 386. Hence, while the slot in the link 385 will permit the pin in the arm 382 to move to the forward end of the slot so as to engage the latch with the pin 284, subsequent movement of the link 385 toward the rear of the machine will disengage the latch 382 from the pin 284 and permit the arm 285 to be rocked clockwise by the spring 287 and the pitman 283 to be elevated, provided one of the keys 40 or 41 has not been depressed in the meantime. Should one of these two keys be depressed before the carriage reaches its end position, the pitman 283 will be held down and the arm 285 will be held in its rocked position and the movement of the latch 382 toward the rear of the machine will be idle at this time. However, this disengagement of the latch will permit the arm 285 and pitman 283 to be restored to their normal positions when the key 40 or the key 41 is released at the end of a multiplication operation.

Once the actuator arm 376 has done its work of depressing the pitman 283, it will quickly be restored to its normal position as shown in Fig. 9 where it will be held by latch 372.

Restoration of the arm 376 is accomplished by means of a roll 387 mounted on a disc 388 secured to the left-hand end of the transverse power shaft 63. This shaft rotates in the direction of the arrow 389 thereby causing the roll 387 to move in such a direction from its normal or full cycle position as shown in Fig. 9 as to immediately restore the arm 376 to its initial position.

*Operation*

When multiplication operations are to be performed on the calculating machine herein shown and described the operator depresses appropriate amount keys 26 in accordance with the value of the multiplicand and then depresses the multiplier numeral keys 36 so as to cause the value of the multiplier to be set into the pin carriage mechanism and displayed on the multiplier dials 37. In accordance with the present invention when the first multiplier numeral key is depressed the pin carriage will be permitted to escape to the left whereby the shaft 261 will be rocked, the latch 372 will be disabled and the actuator arm 376 released to the action of its operating spring 380. The pitman 283 will thereby be forced down and the left shift shaft 286 and the cycle initiating shaft 135 rocked so as to initiate a left shift operation of the accumulator carriage. The left shift operation of the carriage will be continued until it reaches its left end position by virtue of the engagement of the latch 382 with the pin 284 on the arm 285. However, when the carriage reaches its left end position, the latch 382 will be disabled by operation of the override pawl 190 so as to terminate the shifting movement of the carriage. As soon as the multiplier factor has been set into the multiplier pin carriage the operator may cause an automatic multiplication operation to be initiated by depression of the appropriate multiplication control key. This key may be depressed either during the time that the carriage is shifting to its left end position or after the carriage has come to rest in this position, the operation of the machine following the same pattern in either case. If the multiplier is a short number involving only several digits the operator will probably be able to enter the multiplier into the pin carriage and depress one of the multiplication control keys before the carriage has reached its left end position, in which event the carriage will continue shifting toward the left until it has reached its end position whereupon the multiplication initiating lever 334 will be released by the latch 347 (Fig. 9) and an automatic multiplication operation will be commenced with subsequent right hand shifting of the pin carriage 212 and of the accumulator carriage 21. If the multiplier is a large number involving a number of digits, the accumulator carriage may possibly reach its end position before the factor has been completely entered and in this case the carriage will come to rest in its end position and the machine will be ready for the immediate commencement of a multiplication operation upon the depression of one of the control keys 40, 41 or 42.

What I claim as new and desire to secure by Letters Patent is:

1. In a machine of the class described having a power drive, selectively operable means for initiating operation of said power drive, an ordinally shiftable register, means for shifting said register from one ordinal position to another, and selectively operable means for connecting said shifting means with said power drive so as to cause shifting of said register, the combination of means settable in accordance with the various digits of a multiplier factor, means movable from one ordinal position to another each time a digit is set into said setting means, means cooperating with said movable means for causing said initiating means and said connecting means to be operated so as to cause shifting of said register, and means for maintaining said initiating means and said connecting means operative until said register reaches a predetermined position.

2. In a machine of the class described having a power drive, selectively operable means for initiating operation of said power drive, an ordinally shiftable register, means for shifting said register from one ordinal position to another, and selectively operable means for connecting said shifting means with said power drive so as to cause shifting of said register, the combination of a multiplier mechanism adapted to receive a multiplier factor, said mechanism including a carriage means movable from one position to another each time a digit is set into said multiplier mechanism, a normally inoperative power driven actuator for operating said initiating means and said connecting means so as to cause shifting of said register, means operating in response to the first movement of said carriage means from its normal position for rendering said actuator operative and cause shifting of said register, means for maintaining said initiating means and said connecting means operative to cause continued shifting of said register, and means for disabling said maintaining means when said register reaches a predetermined ordinal position.

3. In a machine of the class described having a set of keys which may be manipulated in accordance with the digits of a multiplicand and a set of keys which may be manipulated in accordance with the digits of a multiplier, a power drive means for the machine, an accumulator carriage supported for endwise shifting movement across the machine, means for shifting said carriage, and a clutch for operatively connecting said shifting means with said power drive means, the combination of a multiplier storage mechanism settable by said multiplier keys and including a multiplier carriage having a normal inoperative position and shiftable to positions corresponding to the digits of the multiplier, means operative in response to movement of said multiplier carriage from its normal position for activating said power drive means and engaging said shift clutch, means for maintaining said power drive means and said clutch operative to cause continued shifting of said register, and means for disabling said maintaining means when said accumulator carriage reaches a predetermined ordinal position.

4. In a machine of the class described having an ordinally shiftable register and means adapted to effect sustained uninterrupted shifting of said register from any of a plurality of ordinal positions through a plurality of ordinal positions to a particular ordinal position predetermined as the position in which said register is to be at the starting of a multiplication operation, the combination of a first settable means for receiving the various digits of a multiplicand factor to be entered in said register a number of times corresponding to the multiplier factor of a multiplication problem, a second settable means for receiving the various digits of the multiplier factor of said problem, means operable under the control of said second settable means for effecting entry of said multiplicand factor in said register a number of times corresponding to the multiplier factor received in said second settable means, shift initiation means operating in response to the setting of the first digit into said second settable means for initiating operation of said register shifting means, and shift maintaining means rendered effective by setting of the first digit into said second settable means for maintaining said shifting means operative until said register has been shifted through a plurality of ordinal positions to said particular ordinal position.

5. In a machine of the class described having a power drive, means operable to initiate operation of said power drive, an ordinally shiftable register, means adapted to effect sustained uninterrupted shifting of said register from any of a plurality of ordinal positions through a plurality of ordinal positions to a particular ordinal position predetermined as the position in which said register is to be at the starting of a multiplication operation, and means operable to connect said shifting means with said power drive so as to cause such shifting of said register, the combination of a first settable means adapted to receive a plurality of digits of a multiplicand factor to be entered in said register a number of times corresponding to the multiplier factor of a multiplication problem, a second settable means adapted to receive a plurality of digits of the multiplier factor of said problem, means operable under the control of said second settable means for effecting entry of said multiplicand factor in said register a number of times corresponding to the multiplier factor set in said second settable means, means operating in response to the setting of the first digit into said second settable means for causing said initiating means and said connecting means to be operated, and shift maintaining means rendered effective by setting of the first digit into said second settable means for maintaining said connecting means operative until said register has been shifted through a plurality of ordinal positions to said particular ordinal position.

6. In a machine of the class described having a power drive, selectively operable means for initiating operation of said power drive, an ordinally shiftable register, means adapted to effect sustained uninterrupted shifting of said register from any of a plurality of ordinal positions through a plurality of ordinal positions to a particular ordinal position predetermined as the position in which said register is to be at the starting of a multiplication operation, and selectively operable means for connecting said shifting means with said power drive so as to cause such shifting of said register, the combination of a first settable means adapted to receive a plurality of digits of a multiplicand factor to be entered in said register a number of times corresponding to the multiplier factor of a multiplication problem, a second settable means adapted to receive a plurality of digits of the multiplier factor of said problem, means operable under the control of said second settable means, for effecting entry of said multiplicand factor in said register a number of times corresponding to the multiplier factor set in said second settable means, means operating in response to the setting of the first digit into said second settable means for causing said initiating means and said connecting means to be operated, means for maintaining said connecting means operative until said register reaches said particular ordinal position, and means responsive to setting of the first digit in said second settable means for rendering said maintaining means operative.

7. In a machine of the class described having a power drive, selectively operable means for initiating operation of said power drive, an ordinally shiftable register, means adapted to effect sustained uninterrupted shifting of said register from any of a plurality of ordinal positions through a plurality of ordinal positions to a particular ordinal position predetermined as the position in which said register is to be at the starting of a multiplication operation, and selectively operable means for connecting said shifting means with said power drive so as to cause such shifting of said register, the combination of a first settable means adapted to receive a plurality of digits of a multiplicand factor to be entered in said register a number of times corresponding to the multiplier factor of a multiplication problem, a second settable means adapted to receive a plurality of digits of the multiplier factor of said problem, means operable under the control of said second settable means for effecting entry of said multiplicand factor in said register a number of times corresponding to the multiplier factor set in said second settable means, means operating in response to the setting of the first digit into said second settable means for causing said initiating means and said connecting means to be operated, means for maintaining said connecting means operative, means responsive to setting of the first digit in said second settable means for rendering said maintaining means operative, and means operated by said shifting means after said register has reached said particular ordinal position for disabling said maintaining means.

8. In a machine of the class described having a carriage supported for endwise shifting across the machine, an accumulator register on said carriage, a set of keys which may be manipulated in accordance with the digits of a multiplicand factor to be entered in said register a number of times corresponding to the multiplier factor of a multiplication problem, a set of keys which may be manipulated in accordance with the digits of said multiplier factor, a power drive means for the machine, means adapted to effect sustained uninterrupted shifting of said carriage from any of a plurality of ordinal positions through a plurality of ordinal positions to a particular ordinal position predetermined as the position in which the register is to be at the starting of a multiplication operation, and a clutch for operatively connecting said shifting means with said power drive means, the combination of a device movable ordinally from a home position to a displaced position when the first digit of said multiplier factor is entered by manipulation of the appropriate multiplier key, means operating in response to the ordinal movement of said device from its home position to its ordinally displaced position for activating said power drive means and engaging said shift clutch, and means for maintaining said shift clutch engaged until said register has reached said particular ordinal position.

9. In a machine of the class described having an ordinally shiftable register and means for shifting said register from any of a plurality of ordinal positions through a plurality of ordinal positions to a particular ordinal position predetermined as the position in which said register is to be at the starting of a multiplication operation, the combination of an ordinally shiftable means for receiving the various digits of one of the factors of a multiplication problem, other means for shifting said shiftable means ordinally independently of ordinal shifting of said register, key operated means for effecting operation of said other means and entry of the digits of said factor in said shiftable means, and means actuatable by said shiftable means in response to the ordinal shifting from the first digit receiving position by said shiftable means for initiating operation of said register shifting means and maintaining said register shifting means operative until said register has been shifted to said particular ordinal position.

10. In a machine of the class described having an ordinally shiftable register and means for shifting said register from any of a plurality of ordinal positions to a particular ordinal position predetermined as the position in which said register is to be at the starting of a multiplication operation, the combination of a first settable means for receiving the various digits of a multiplicand factor to be entered in said register a number of times corresponding to the multiplier factor of a multiplication problem, a second settable means for receiving the various digits of the multiplier factor of said problem, multiplier keys for controlling the entry of the multiplier factor in said second settable means, means operable under the control of said second settable means for effecting entry of said multiplicand factor in said register a number of times corresponding to the multiplier factor received in said second settable means, an ordinally shifting member operated from the depression of said multiplier keys, and means cooperating with said ordinal shifting member for initiating operation of said register shifting means to shift said register to said particular ordinal position.

GRANT C. ELLERBECK.

REFERENCES CITED

The following references are of record in the file of this patent:

UNITED STATES PATENTS

| Number | Name | Date |
|---|---|---|
| 1,915,037 | Suter | June 20, 1933 |
| 2,081,008 | Hammann | May 18, 1937 |
| 2,294,948 | Avery | Sept. 8, 1942 |
| 2,399,917 | Friden et al. | May 7, 1946 |